E. N. KRING.
DIBBLE DEVICE.
APPLICATION FILED NOV. 24, 1915.

1,183,653.  Patented May 16, 1916.

Witnesses
Philip E. Barnes
E. J. Sheely

Inventor
E. N. Kring.
By James J. Sheely & Co.
Attorneys

UNITED STATES PATENT OFFICE.

EDWARD N. KRING, OF FAIRBURY, ILLINOIS.

DIBBLE DEVICE.

1,183,653.      Specification of Letters Patent.      Patented May 16, 1916.

Application filed November 24, 1915. Serial No. 63,343.

*To all whom it may concern:*

Be it known that I, EDWARD N. KRING, a citizen of the United States, residing at Fairbury, in the county of Livingston and State of Illinois, have invented new and useful Improvements in Dibble Devices, of which the following is a specification.

My present invention pertains to dibbles and the like; and it consists in the peculiar and advantageous dibble device hereinafter described and claimed.

Figure 1:
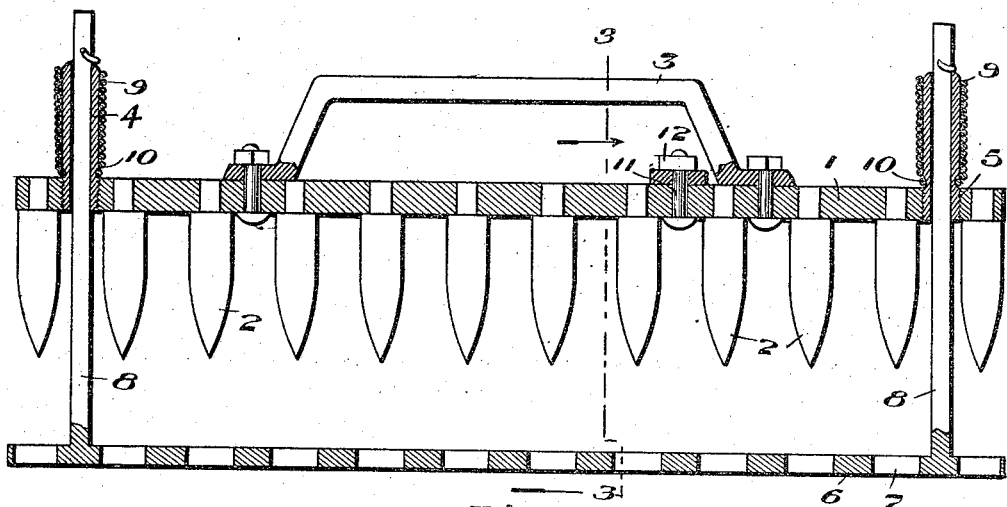
Figure 2:
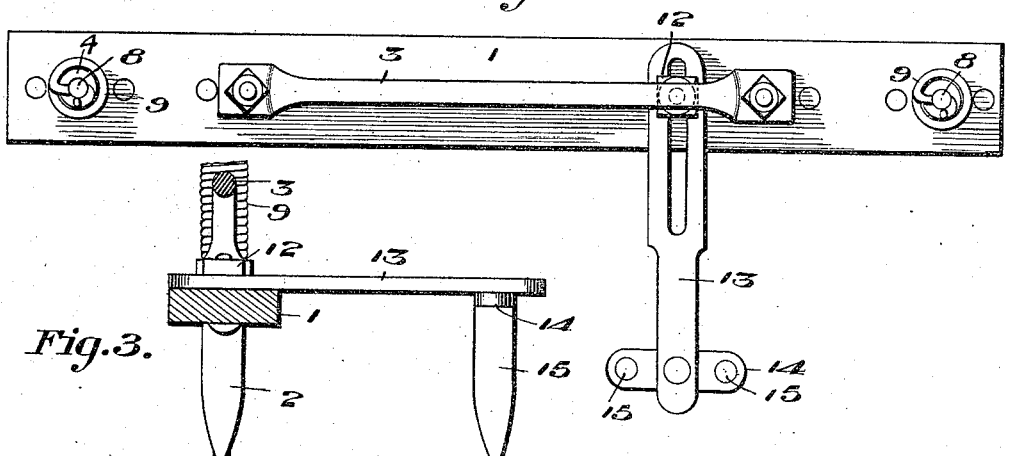
Figure 3:
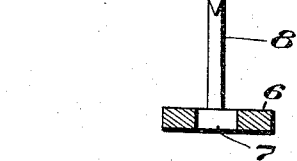

In the accompanying drawings which are hereby made a part hereof: Figure 1 is a longitudinal section of a dibble device constructed in accordance with my invention. Fig. 2 is a top plan view of the same. Fig. 3 is a transverse section, taken in the plane indicated by the line 3—3 of Fig. 1, looking in the direction indicated by arrow.

Similar numerals of reference designate corresponding parts in all of the views of the drawings.

The body 1 of my novel dibble device may be made of any material suitable to the purpose, and is equipped with a longitudinal series of spaced dibbles 2, fixed in any approved manner with respect to the body.

Fixed on the upper side of the body 1 is a handle 3, and also fixed to and rising from the body are vertically-disposed guide tubes 4. In the present and preferred embodiment of my invention said tubes 4 are threaded at their lower ends in the body, as indicated by 5 in Fig. 1.

Disposed below the body 1 is a ground plate 6, having apertures 7, alined with and designed for the passage of the dibbles 2. On said ground plate 6 are upright rods 8 which extend through the tubes 4 and serve for the connection of coiled springs 9. At the lower ends said springs 9 are connected to the lower portions of the tubes 4 or to the body 1, in the discretion of the manufacturer and in the preferred embodiment of my invention the lowermost whirls of the springs are seated in circumferential grooves 10 in the lower portions of tubes 4, this provision being advantageous since it tends to strengthen the connections of the lower ends of the springs and in that way prolongs the usefulness thereof.

Adjustably connected, as by a bolt 11 and nut 12, to the body 1 is a slotted bar 13 that is disposed at right angles to the body, and carried by said bar is a head 14 on which there are two or more dibbles 15.

In the practical use of the device, it will be manifest that when the plate 6 is arranged on the ground, and the body 1 is pressed downwardly against the action of the springs 9, the dibbles 2 will be passed through the plate holes 7 and will form holes for plants in the ground. It will also be manifest that when the operator relieves pressure on the body 1 sufficiently for the springs 9 to withdraw the dibbles through the plate 6, the tendency of the springs to contract will have the effect of holding the plate 6 under yielding pressure against the ground with the result that the plate is enabled to prevent soil from falling into the holes during the operation.

Incidental to the formation of a longitudinal series of holes by the dibbles 2, the auxiliary dibbles 15 form holes in spaced and parallel relation to those formed by the dibbles 2. Consequently the operator is enabled to accurately place the device in forming the holes in the ground for the next adjoining row of plants. By virtue of the adjustable fixture of the bar 13, to the body 1, the distance between the rows to be formed by the dibbles 2 may be varied as desired.

Having described my invention, what I claim and desire to secure by Letters Patent, is:

1. A dibble device, comprising a body having a longitudinal series of dibbles, tubes fixed to and rising from said body and having circumferential grooves located adjacent to the body, a ground plate having apertures for the passage of the dibbles and also having rods on which said tubes are movable, and coiled springs surrounding the tubes and connected at their upper ends to the rods and having their lower ends connected with the body and also having their lowermost whirls seated in said grooves of the tubes.

2. A dibble device, comprising an apertured ground plate having upright guiding means thereon, a dibble-carrying body movable on said upright guiding means, and spring means constructed and arranged relatively to the guiding means and the body to pass the ground plate against the ground during the withdrawal of the dibble through the ground plate.

3. A dibble device, comprising an apertured ground plate having upright guiding means thereon, a dibble-carrying body movable on said upright guiding means, spring means constructed and arranged relatively to the guiding means and the body to press the ground plate against the ground during the withdrawal of the dibble, and dibble-carrying means adjustably fixed to and extending laterally from the body.

4. A dibble device, comprising a dibble-carrying body having upright guide tubes, an apertured ground plate having rods on which said body and tubes are movable, and coiled springs surrounding the tubes and connected to the body and the upper portions of the rods.

In testimony whereof I have hereunto set my hand in presence of two subscribing witnesses.

EDWARD N. KRING.

Witnesses:
A. B. CLAUDEN,
G. B. SPENCE.

Copies of this patent may be obtained for five cents each, by addressing the "Commissioner of Patents, Washington, D. C."